March 10, 1925.  
W. F. GROENE  
ENGINE LATHE  
Filed June 6, 1921  
1,528,971  
2 Sheets-Sheet 1
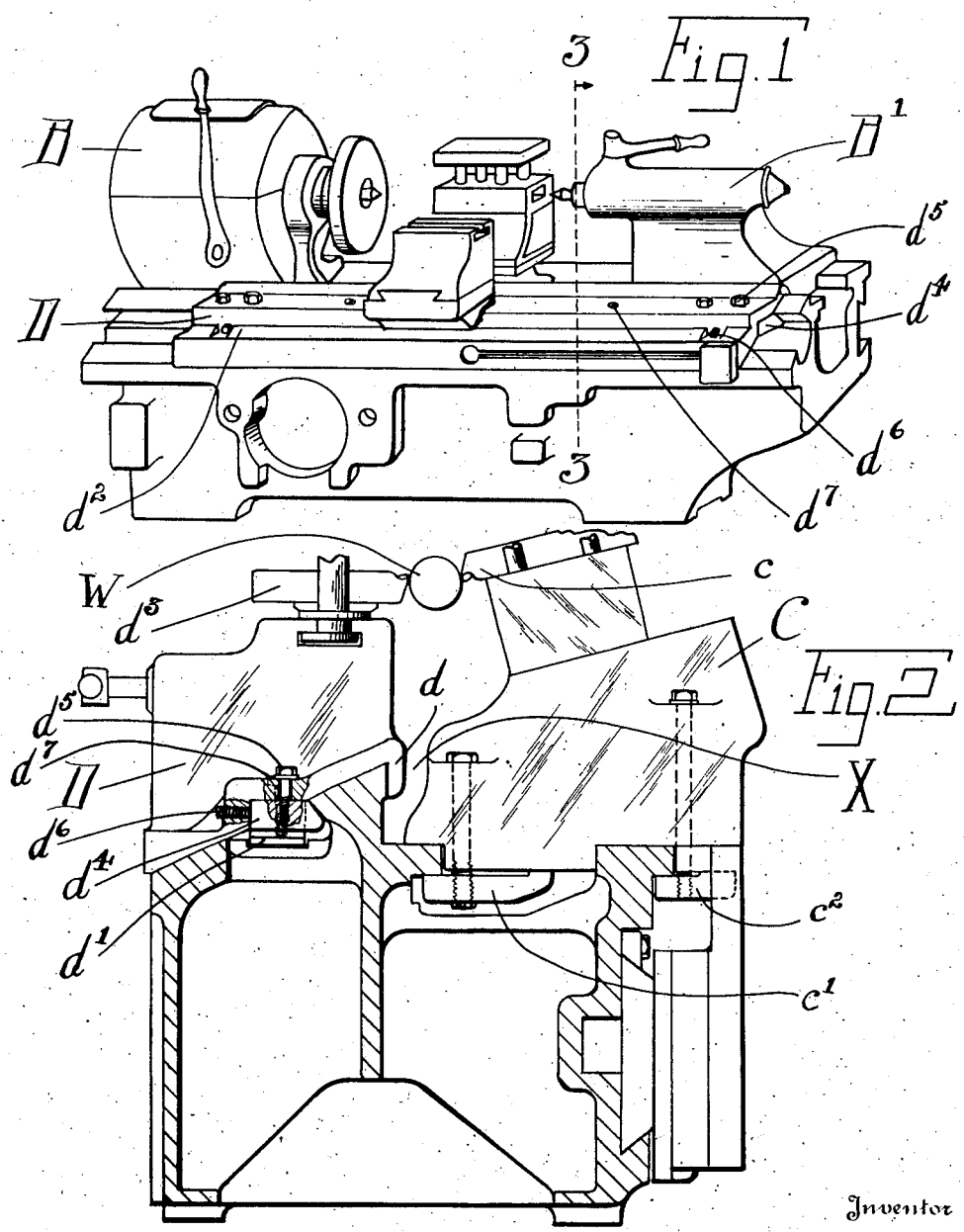

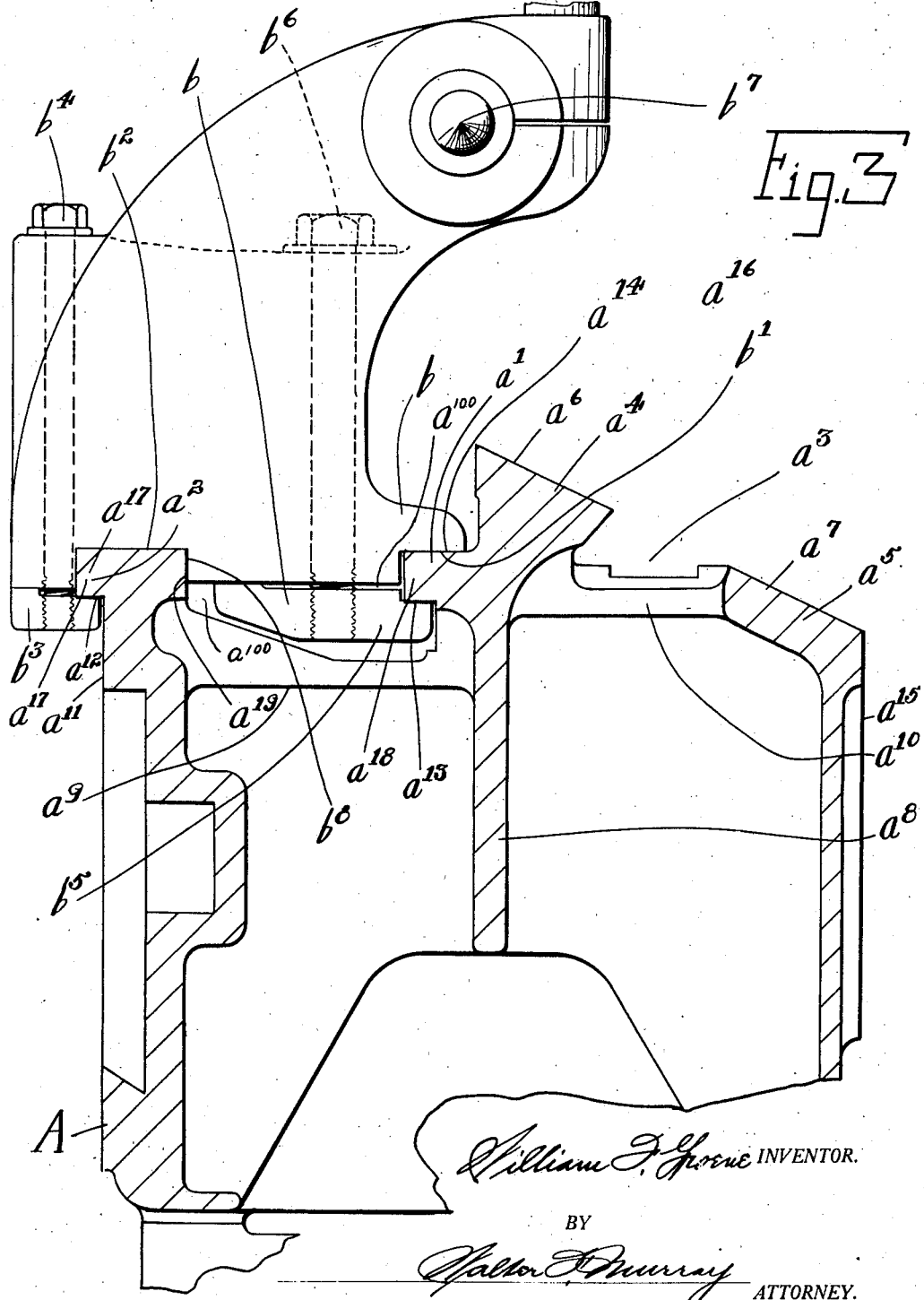

Patented Mar. 10, 1925.

1,528,971

UNITED STATES PATENT OFFICE.

WILLIAM F. GROENE, OF CINCINNATI, OHIO, ASSIGNOR, BY MESNE ASSIGNMENTS, TO THE R. K. LE BLOND MACHINE TOOL COMPANY, OF CINCINNATI, OHIO, A CORPORATION OF DELAWARE.

ENGINE LATHE.

Application filed June 6, 1921. Serial No. 475,363.

*To all whom it may concern:*

Be it known that I, WILLIAM F. GROENE, a citizen of the United States of America, and a resident of Cincinnati, in the county of Hamilton and State of Ohio, have invented a new and useful Improvement in an Engine Lathe, of which the following is a specification.

This invention relates to metal working machinery and has for its object the elimination of spring in the bed when the cutting tool supports are secured upon the bed.

Another object is to provide a lathe in which chips and cuttings may pass through the bed so as not to accumulate upon and over the bed.

Another object is to provide a device for the purposes stated in which it will be impossible for dirt to lodge under the carriage bearing.

Another object is to provide a device for the purposes stated in which the thrust is directed immediately against the lathe in such direction that no lost motion or play is developed as a result thereof.

These and other objects are attained by the means described herein and disclosed in the accompanying drawings, in which—

Fig. 1 is a fragmental perspective view of a lathe embodying my invention.

Fig. 2 is an enlarged transverse sectional view of parts shown in Fig. 1.

Fig. 3 is an enlarged sectional view on line 3—3 of Fig. 1.

The lathe bed A embodying my invention has a horizontal way $a^{100}$ extending longitudinally of the bed, which together with the rails $a'$ and $a^2$ formed on opposite sides of the way, extend substantially half the width of the lathe bed. A second way $a^3$ extends longitudinally of the bed and has disposed on its opposite side the rails $a^4$ and $a^5$, the upper surfaces of which, $a^6$ and $a^7$ respectively, are inclined upwardly toward the center of the lathe bed. The way $a^3$, together with the rails $a^4$ and $a^5$, extend substantially the remaining half the width of the lathe bed. The centermost and uppermost of the inclined rails $a^4$ terminates adjacent to and above the inner or centermost horizontal rail $a'$. A longitudinally extending center rib $a^8$ supports the center rails $a'$ and $a^4$. Transverse ribs $a^9$ extend between the center rib $a^8$ and the one side or cheek $a^{11}$ of the lathe bed and ribs $a^{10}$ extend between the center rib $a^8$ and the other side or cheek $a^{15}$ of the lathe bed. If desired the transverse ribs may terminate upon the outer rails $a^2$ and $a^5$ as shown in Fig. 3. This construction gives great strength and rigidity to the lathe bed. The rail $a^2$ has formed upon it a flange $a^{17}$ extending outwardly, beyond the side or cheek $a^{11}$ of the lathe bed, the flange having an underlying surface $a^{12}$ extending longitudinally of the lathe bed. The rail $a'$ has a similarly formed flange $a^{18}$ having an under surface $a^{13}$ formed upon it, the flange extending toward the side $a^{11}$ of the lathe bed.

The head stock B and tail stock B' are mounted upon the rails $a'$ and $a^2$ in substantially the same manner and extend into the way $a^{100}$ between the said rails. A flange $b$ is formed upon the inner lower portion of the head stock and the tail stock, and the under surface $b'$ thereof engages the upper surface $a^{14}$ of the rail $a'$ and the flange $a^{18}$. A longitudinal groove $b^2$ is formed in the outer lower portion of the head stock and tail stock in which the outer rail $a^2$ is adapted to slidably engage. The inner wall $b^8$ of the groove $b^2$ engages the inner face $a^{19}$ of the rail $a^2$. Blocks $b^3$ are mounted upon the outer ends of the head and tail stocks and are adapted to engage the under surface $a^{12}$ of flange $a^{17}$ formed on the rail $a^2$, the blocks being adapted to be clamped upon the flange $a^{17}$ and upon the head and tail stocks by means of a threaded bolt $b^4$ extending vertically through the head and tail stocks and engaging the blocks $b^3$. Similarly functioning blocks $b^5$ are mounted upon the lower portion of the head and tail stocks and are adapted to engage the under surface of flange $a^{18}$ formed on the rail $a'$. Bolts $b^6$ are employed to clamp the head and tail stocks and their blocks upon the horizontal rail $a'$.

From the foregoing it is readily apparent that the head and tail stocks may be adjusted longitudinally of the lathe bed. The head and tail stocks support the turning centers $b^7$ above the rails on a line that extends vertically through the lathe of a point substantially equidistant from the sides or cheeks of the lathe bed.

A tool carriage C is mounted upon the rails $a'$ and $a^2$ and may be adjustably secured thereupon in the same manner as are the head and tail stocks secured thereupon.

A carriage D is mounted upon the inclined rails $a^4$ and $a^5$. The carriage D has a downwardly projecting flange $d$ adapted to lie over and engage the downwardly and substantially vertically extending face $a^{16}$ formed on the center inclined rail $a^4$. The carriage D may be reciprocated longitudinally of the bed by any suitable driving means, and towards this end a suitable rack $d'$ may be mounted upon the under surface of the carriage D and may extend into the way $a^3$ formed between the rails $a^4$ and $a^5$. The carriage D is preferably elongated as shown in Fig. 1 and the upper surface $d^2$ thereof is inclined downwardly and outwardly from the center of the lathe, wherefore the chips that may fall thereupon are immediately discharged from the carriage, wherefore the carriage protects the rails $a^4$ and $a^5$ from the shavings and chips. Should the carriage C be moved to such a place that the way in which it moves is exposed adjacent the place where a cut is being made upon some work, the shavings are free to pass through the bed of the lathe and therefore will not accumulate about the cutting tool and upon the top of the lathe bed. The inclined faces of the rails $a^4$ and $a^5$ shed the chips and prevent accumulation thereof upon the bed. In the same way the way $a^{100}$ permits the escape of chips through the lathe bed.

The advantages of this construction will be more readily observed by referring to Fig. 2 and assuming that a piece of work W disposed between the head and tail stocks of the lathe, is being operated upon by the tools $d^3$ and $c$ mounted upon the carriages D and C respectively. The work is revolved in a counter clock-wise direction. The thrust upon the tool $d^3$ is downwardly and outwardly, wherefore the flange $d$ and the base of the carriage D are rigidly and firmly held in engagement with the face $a^{16}$ and the rails $a^4$ and $a^5$ respectively. This arrangement precludes any lost motion or play developing between the carriage D and the bed. The thrust upon the tool $c$ is upwardly and outwardly, wherefore the blocks $c'$ and $c^2$ mounted upon the carriage C and corresponding to the blocks $b^3$ and $b^5$ on the head and tail stocks, preclude the development of play between the lathe bed and the carriage C. The carriage C, in that it is rigidly secured to the lathe bed, will preclude the development of any spring between the lathe bed, the work and the cutting tool $c$. The carriage D can be readily moved by and beyond the head and tail stocks B and B', and beyond the carriage C, because the rail $a^4$ extends above the rail $a'$. The clearance provided between the carriage D and the head and tail stocks and between the carriage D and the carriage C, as shown at X in Fig. 2, makes this possible. The thrust on the carriage D being downwardly and outwardly precludes the accumulation of dirt between the carriage D and the lathe bed, wherefore there will be no inaccuracy developing from this arrangement of parts. In the same way the blocks $c'$ and $c^2$, in that they engage upon the under surfaces $a^{12}$ and $a^{13}$ of the rails $a^2$ and $a'$ respectively, are protected from the accumulation of dirt between themselves and the blocks by that part of the carriage C overlying the upper surfaces of the rails $a'$ and $a^2$ The gibs $d^4$ are secured upon the carriage D by means of the hex head screws $d^5$ and engage the rails or shear $a^4$. The headless set screws $d^6$ engage the gib to keep it in engagement upon the rails as wear takes place. The rack is secured upon the carriage by mean of the fillister head screws $d^7$. The sides of the rail $a^4$ converge downwardly; therefore the gibs preclude separation of the carriage from the inclined rails and at the same time provide the means for taking up wear between the carriage D and the inclined rails.

What I claim is:

1. In a machine of the character described the combination of a bed having a horizontal upper face and an inclined upper face and longitudinal ways formed in the upper faces, work supports mounted upon the horizontal face, and a tool support mounted upon the inclined face, the inclined way having its highest portion disposed adjacent the longitudinal center of the bed.

2. In a machine of the class described the combination of a bed having a horizontal upper face and an inclined upper face and extending adjacent the longitudinal center of the bed, the upper end of the inclined face terminating adjacent and above the horizontal face, longitudinal ways formed in the upper faces, work supports mounted upon the horizontal faces and extending into the way therein, and a tool support mounted upon the inclined face extending into the way therein.

3. In a machine of the class described the combination of a bed having a horizontal upper face and an inclined upper face, the upper end of the inclined face terminating adjacent and above the horizontal face, longitudinal ways formed in the upper faces, work supports mounted upon the horizontal face and extending into the way therein, and a tool support mounted upon the inclined face extending into the way therein and movable over the inclined face past the said work supports.

4. A lathe, having in combination, a bed comprising a center rib extending longitudinally of the bed, a horizontal rail mounted upon the upper end of the rib, an outwardly and downwardly inclined rail mounted upon the upper end of the rib, a second horizontal rail in alignment with the first mentioned horizontal rail mounted on one side of the lathe, a second inclined rail in alignment with the first mentioned inclined rail, transverse support ribs extending from the center rib and the centermost rails to the outer rails and the sides of the lathe, a way formed between the two horizontal rails and between the two inclined rails and extending longitudinally of the bed, work supports mounted on the horizontal rails and a tool support mounted on the inclined rails.

5. In a lathe having in combination, a bed having a horizontal upper surface extending substantially midway the width of the lathe bed and an inclined upper surface extending substantially from the horizontal upper surface to the other side of the lathe, ways formed in the said upper surfaces and extending longitudinally of the lathe bed, the inclined surface extending outwardly and downwardly from the center of the lathe bed, a substantially vertical face extending downwardly from the centermost portion of the inclined face to the centermost portion of the horizontal face, work supports mounted on the horizontal face spaced from the junction of the inclined face and the vertical face extending downwardly therefrom, and a tool support mounted upon the inclined face and having a downwardly projecting flange adapted to engage the vertically downward extending face extending from the centermost portion of the inclined face, the flange on the tool support being spaced from the work supports.

6. In a lathe the combination of a bed comprising a center rib extending longitudinally of the bed, horizontal rails formed upon one side of the center rib, outwardly and downwardly inclined rails formed on the opposite side of the center rib, ways extending longitudinally of the bed spacing the inner rails from the outer rails of each series, the inner rails being supported by the center rib, work supports mounted upon the horizontal rails adapted to position work substantially midway of the width of the lathe, a tool support mounted upon the horizontal rails comprising a flange adapted to engage upon the upper surface of the innermost horizontal rail, a block mounted upon the tool support engaging the under surface of the innermost rail, a block mounted on the tool support adapted to engage the under surface of the outermost horizontal rail, and means to clamp the blocks upon the rails and upon the tool support, and a second tool support mounted upon the inclined faces and movable past the work supports and the first mentioned tool support.

7. In a machine of the class described the combination of a bed having rails having horizontal aligned upper faces spaced by a way extending longitudinally of the bed, one rail being disposed substantially midway of the width of the lathe bed, and a second or outer rail being disposed substantially over one lathe cheek, a flange formed on each rail extending in a common direction away from the center of the lathe bed and each having an underlying face parallel with the upper faces thereof, the outer rail having a substantially vertical face formed on its centermost portion, work supports mounted on the horizontal rails engaging the vertical face formed on the outer rail, blocks mounted on the work supports engaging the underlying faces of the flanges, bolts adapted to clamp the blocks upon the flanges and the work supports whereby the work supports may be secured upon the horizontal ways, the work supports being adapted to position the center of the work substantially midway of the width of the lathe bed, inclined rails having aligned upper faces extending outwardly and downwardly and spaced by a way extending longitudinally of the bed, one of said inclined rails being disposed immediately adjacent the centermost horizontal rail and terminating above the centermost horizontal rail, a second or outer inclined rail being disposed substantially over the opposite lathe cheek, a substantially vertical face extending downwardly from the centermost inclined rail, a tool support mounted on the inclined rails, and a flange mounted on the tool support engaging the vertical face extending from the centermost inclined rail.

8. In a machine of the class described the combination of a bed having rails having horizontal aligned upper faces spaced by a way extending longitudinally of the bed, one rail being disposed substantially midway of the width of the lathe bed, and a second or outer rail being disposed substantially over one lathe cheek, a flange formed on each rail extending in a common direction away from the center of the lathe bed and each having an underlying face parallel with the upper faces thereof, the outer rail having a substantially vertical face formed on its centermost portion, work supports mounted on the horizontal rails engaging the vertical face formed on the outer rail, blocks mounted on the work supports engaging the underlying faces of the flanges, bolts adapted to clamp the blocks upon the flanges and the work supports whereby the work supports may be secured upon the horizontal ways, the work supports being adapted to position the center of the work substantially midway of the width of the lathe bed, inclined rails having aligned upper faces extending outwardly and downwardly and spaced by a way extending longitudinally of the bed, one of said inclined rails being disposed immediately adjacent the centermost horizontal rail and terminating above the centermost horizontal rail, a second or outer inclined rail being disposed substantially over the opposite lathe cheek, a substantially vertical face extending downwardly from the centermost inclined rail, a tool support mounted on the inclined rails, a flange mounted on the tool support engaging the vertical face extending from the centermost inclined rail, and a center rib extending longitudinally of the bed supporting the centermost horizontal and inclined rails.

9. In a machine of the class described the combination of a bed having rails having horizontal aligned upper faces spaced by a way extending longitudinally of the bed, one rail being disposed substantially midway of the width of the lathe bed, and a second or outer rail being disposed substantially over the one lathe cheek, a flange formed on each rail extending in a common direction away from the center of the lathe bed and each having an underlying face parallel with the upper faces thereof, the outer rail having a substantially vertical face formed on its centermost portion, work supports mounted on the horizontal rails engaging the vertical face formed on the outer rail, blocks mounted on the work supports engaging the underlying faces of the flanges, bolts adapted to clamp the blocks upon the flanges and the work supports whereby the work supports may be secured upon the horizontal ways, the work supports being adapted to position the center of the work substantially midway of the width of the lathe bed, inclined rails having aligned upper faces extending outwardly and downwardly and spaced by a way extending longitudinally of the bed, one of said inclined rails being disposed immediately adjacent the centermost horizontal rail and terminating above the centermost horizontal rail, a second or outer inclined rail being disposed substantially over the opposite lathe cheek, a substantially vertical face extending downwardly from the centermost inclined rail, a tool support mounted on the inclined rails, a flange mounted on the tool support engaging the vertical face extending from the centermost inclined rail, a center rib extending longitudinally of the bed supporting the centermost horizontal and inclined rails, and transverse support ribs extending from the sides of the bed and the rails mounted thereupon to the center rib and the rails supported thereby.

10. In a machine of the character described the combination of a bed having a horizontal upper face and an inclined upper face having its upper edge disposed adjacent the longitudinal center of the bed and having longitudinal ways formed in the upper faces, work supports mounted upon the horizontal face, a tool support mounted upon the inclined face, and a gib mounted on the last mentioned support slidably securing the last mentioned support on the inclined face.

11. In a machine of the class described the combination of a bed having horizontal rails formed thereon and inclined rails formed thereon, all the rails extending longitudinally thereof, and one each of the horizontal rails and of the inclined rails being disposed substantially intermediate the lathe cheeks, the centermost inclined rail having downwardly converging sides, work supports mounted on the horizontal rails, a tool support mounted on the inclined rails, and a gib mounted on the tool support, the gib and one portion of the tool support extending over the downwardly converging sides, whereby the tool support may be slidably mounted on the inclined rail and whereby separation of the tool support and the carriage is precluded.

12. In a machine of the character described the combination of a bed having a horizontal upper face and an inclined upper face, both said faces extending longitudinally of the bed, work supports mounted upon the horizontal face, the bed also having an abutment face depending from the inclined face, and a tool support engaging the depending abutment face and the inclined face whereby the lathe bed intermediate said inclined upper face and abutment face may be utilized for resisting pressure directed upon the tool support.

13. In a machine of the character described the combination of a bed having a horizontal upper face and an inclined upper face, a depending abutment face depending from the upper edge of the inclined upper face, the depending abutment face and the upper edge of the said inclined face being disposed adjacent the longitudinal center of the bed, work supports mounted upon the horizontal face, and a tool support engaging the inclined face and the depending abutment face whereby the bed portion intermediate said inclined face and depending abutment face may be utilized for resisting pressure directed upon the tool support.

14. In a machine of the character described the combination of a bed having a horizontal upper face and an inclined upper face, an abutment face depending from the upper edge of the inclined upper face, the depending abutment face and the upper edge of the said inclined face being disposed adjacent the longitudinal center of the bed, work supports mounted upon the horizontal face, a tool support engaging the inclined face and the depending abutment face whereby the bed portion intermediate said inclined face and depending abutment face may be utilized for resisting pressure directed upon the tool support, and means for reciprocating the tool support longitudinally of the said inclined face and depending abutment face.

In testimony whereof, I have hereunto subscribed my name this 3rd day of June, 1921.

WILLIAM F. GROENE.